Feb. 20, 1951 F. J. NAGEL 2,542,048
RESINOUS COMPOSITIONS
Filed Oct. 12, 1946
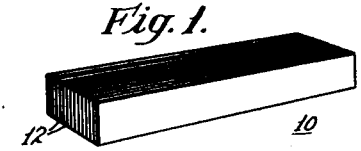
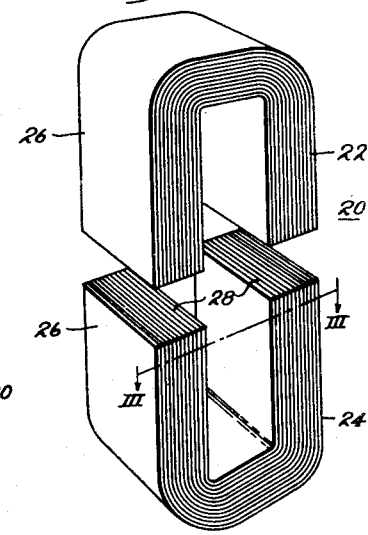
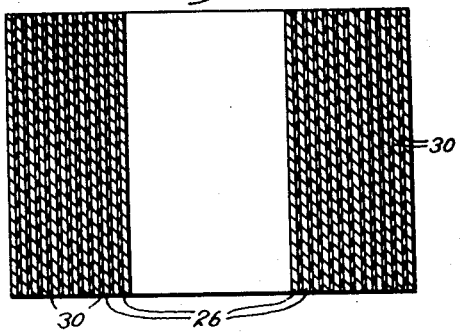
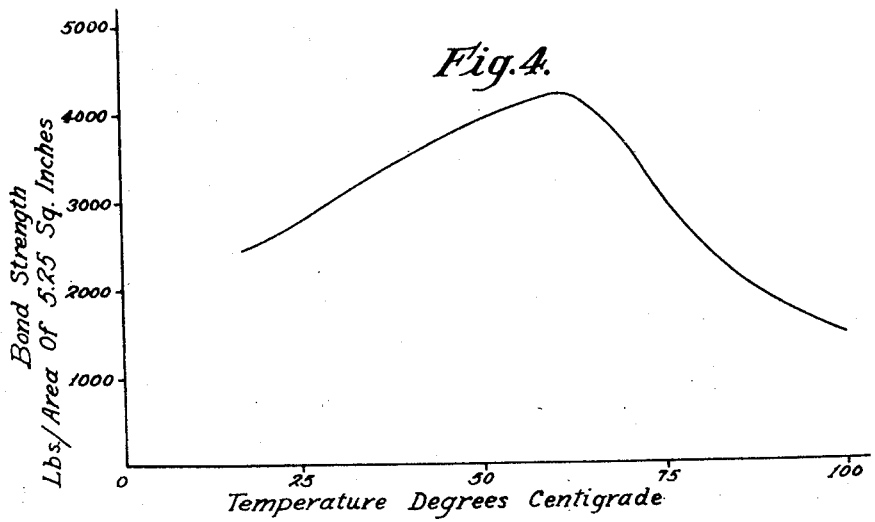
WITNESSES:
Edward Michaels
[signature]
INVENTOR
Fritz J. Nagel.
BY
Frederick Shapoe
ATTORNEY Patented Feb. 20, 1951

2,542,048

UNITED STATES PATENT OFFICE 2,542,048

RESINOUS COMPOSITIONS

Fritz J. Nagel, Pittsburgh, Pa., assignor to Westinghouse Electric Corporation, East Pittsburgh, Pa., a corporation of Pennsylvania Application October 12, 1946, Serial No. 702,993

11 Claims. (Cl. 154—43)

This invention relates to resinous compositions, which may be employed for coating and molding purposes, and are particularly suitable for bonding members, including metal members, to one another, and the product produced by the application of such compositions to members.

This application is a continuation-in-part of my copending patent application, Serial No. 556,388, filed September 29, 1944, entitled "Bonding Materials," now abandoned.

It has long been held desirable to have available resinous adhesive compositions possessing good bond strengths at temperatures of the order of 100° C. A particularly desirable characteristic for the adhesives has been the requirement that sheets of metal be bonded with sufficient strength to permit machining, such as sawing, grinding or milling, to be carried out without breaking of the bond. In the electrical industry, for example, it is highly desirable to prepare magnetic cores from laminations of magnetic material by applying thereto a resinous adhesive which would unite the laminations into a core capable of being subsequently machined and assembled or otherwise treated without delamination.

While thermoplastic resinous binders have been suggested for uniting laminations of metal to produce consolidated members therefrom for many applications, the thermoplastic resins lack adequate bond strength at reasonable elevated operating temperatures. Magnetic cores, for example, may delaminate at temperatures within the range of expected operating temperatures of transformers in which they are incorporated. Thermosetting resinous compositions, such as, for example, as phenol formaldehyde, applied to magnetic sheet material in order to unite the sheets into cores have been found unsatisfactory, since they induce strains in the magnetic material on hardening. Furthermore, most thermosetting resins are relatively brittle and lack adequate bond strength for many purposes, while in other cases, the bond has been unsatisfactory when subjected to shock or vibration.

The object of this invention is to provide a thermosetting type resinous binder capable of maintaining a good bond at elevated temperatures.

A further object of this invention is to provide a resinous composition which when applied as a binder to members will thermostat and possess sufficient toughness and elasticity to withstand machining and shocks without delaminating.

A still further object of the invention is to provide a metallic body composed of a plurality of spaced parts united by a thermosetting resinous composition capable of maintaining a good bond at temperatures of the order of 100° C.

Other objects of the invention will, in part, be obvious and will, in part, appear hereinafter.

For a fuller understanding of the nature and objects of the invention, reference should be had to the specification and drawing, in which:

Figure 1 is a perspective view of a bar core;

Fig. 2 is an exploded perspective view of two U-shaped matching core segments;

Fig. 3 is an enlarged cross-sectional view taken along line III—III in Fig. 2; and Fig. 4 is a graph plotting bond strength against temperature.

It has been discovered that a resinous composition prepared from 10 to 100 parts by weight of a 1,3 polyhydroxy benzene-formaldehyde reaction product prepared as disclosed in detail hereinafter and 100 parts by weight of a thermoplastic resinous polymer of compounds having the group $H_2C=C<$ possesses certain novel and unexpected characteristics. In particular, the resinous composition may be applied to metal as an adhesive binder to produce consolidated bodies of extraordinary strengths even at temperatures of 100° C. and higher. Furthermore, the adhesive does not induce strains or otherwise impair the magnetic properties of magnetic laminations bonded therewith into a core.

While it has been proposed to prepare resinous compositions from 1,3 polyhydroxy benzenes and formaldehyde and to employ them as adhesives alone or in combination with various other resinous products, in actual practice the polyhydroxy benzene-formaldehyde resins prepared by prior art practice have possessed many unsatisfactory characteristics. Using the best knowledge of the prior art, usually it has been substantially impossible to react polyhydroxy benzenes with formaldehyde in equimolar proportions to a potentially reactive state. At best, the intermediate polymers produced have been quite unstable and react to an infusible state in a few hours. (Note Example No. 4 of Novotny Patent 1,776,366.) The reaction is so violent that reactants usually form an insoluble resinous composition in an advanced state of polymerization. Commercial batches of several hundred pounds of resin are not feasible in any event. Other defects encountered by those skilled in the art have rendered it commercially impractical to produce polyhydroxy benzene-formaldehyde resinous compositions suitable for regular use.

According to the present invention, I have been able to react controllably to produce highly useful resinous products, substantially equimolar proportions of formaldehyde, or a polymer of formaldehyde, with a 1,3 polyhydroxy benzene having the unit formula

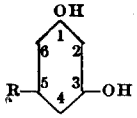

where R is a radical selected from the group consisting of hydrogen, hydroxyl, halide, carboxyl, and saturated aliphatic hydrocarbon radicals and having not more than one substituent selected from this group, other than hydrogen, for hydrogen in the 2,4,6 positions. Examples of suitable polyhydroxy benzenes having the above unit formula are resorcinol, orcinol (5-methyl—1,3-dihydroxy benzene), pyrogallol (1,2,3,-trihydroxy benzene), 1,3-dihydroxy-4-chlorobenzene, alpha-resorcyclic acid (3,5-dihydroxy benzoic acid) and phloroglucinol (1,3,5-trihydroxy benzene).

For a controllable reaction with the polyhydroxy benzene having the above unit formula, it is necessary to employ substantially anhydrous formaldehyde or an anhydrous polymer of formaldehyde and effect the reaction in the absence of any substantial amount of water. Exceptionally good results have been obtained with paraformaldehyde. Trioxane, using a mineral acid catalyst to effect depolymerization thereof, will give good results. Other polyoxymethylenes substantially free from any water may be employed in the practice of the invention. The polyhydroxy benzene also must be substantially anhydrous.

The reaction of a polyhydroxy benzene having the unit formula

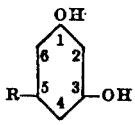

as above described, with substantially anhydrous formaldehyde or its polymers may be controllably conducted only in the presence of substantially anhydrous solvent composed of a certain minimum of methanol as the critical ingredient. By substantially anhydrous methanol is meant methanol with less than 2% water-preferably 99% to 100% pure methanol. The anhydrous methanol must be present in an amount equal to at least 25% of the combined weight of the polyhydroxy benzene, formaldehyde and solvent. Best results have been obtained where the methanol comprises the entire solvent and is approximately 35% to 40% of the total weight of the reactants and solvent. Larger amounts of methanol may be employed with added benefits. The term "methanol" as employed herein refers to substantially anhydrous methanol.

It has been found that no other solvent than anhydrous methanol enables making a predetermined reaction product from equimolar proportions of 1,3-polyhydroxy benzenes and formaldehyde, in either laboratory or commercial batches. Anhydrous ethanol, while tempering the reaction in quantities of reactants of less than a liter, is ineffective in preventing violent reaction in larger batches.

A catalyst for promoting the reaction of the polyhydroxy benzene and formaldehyde is required. The amount of any one catalyst may vary within a relatively wide, though critical, range. Both acidic, basic, and salt catalysts may be employed. The proportion of catalyst depends upon the relative strength of the catalyst. For example, in reacting equimolar proportions of resorcinol and paraformaldehyde in the presence of 45% by weight of methanol based on the weight of the resorcinol, the following proportions of various catalysts based on the weight of resorcinol gave good results:

Example I 0.4% ammonium hydroxide
0.60% aniline
0.2% ethylene diamine
0.04% hydrochloric acid
0.1% phosphoric acid
0.2% oxalic acid Using one-quarter of the proportions indicated in Example I, the reaction was smooth, though slightly slower. Other suitable acidic catalysts are sulphuric acid and acetic acid. Other basic catalysts that may be employed are sodium hydroxide, calcium hydroxide, m-phenylene diamine, p-phenylene diamine, and hexamethylenetetramine. Ferric chloride and other salts which give a strong reaction also may be employed. Substantially the same proportions of catalyst may be employed in reacting other polyhydroxy benzenes than resorcinol.

The amount of catalyst may be increased somewhat over the above proportions given in Example I, particularly if larger proportions of anhydrous methanol are present; thus with 114% methanol, based on the weight of the resorcinol, 1% of ammonium hydroxide gives good results. With 114% methanol, 0.25% of hydrochloric acid may be successfully employed.

As little as 0.01% ammonium hydroxide or hydrochloric acid has been employed with satisfactory reaction. In some cases these lesser amounts of catalyst are beneficial in that the reaction is smoother and easier to control. While the anhydrous solvent employed as the reaction medium must contain methanol as the critical ingredient, it is possible to add other low boiling point non-reactive solvents that are stable in the presence of formaldehyde and the polyhydroxy benzene, providing the boiling point of such added solvent does not exceed 100° C. and that the reflux temperature does not appreciably exceed 100° C. Anhydrous ethanol, isopropanol and n-butanol, ethyl acetate, n-butyl acetate and ethyl propionate may be combined with the methanol for this purpose. In any event, the proportion of methanol to the entire reaction mixture including the solvent should be at least 25%, preferably higher. The other components of the solvent, other than methanol, act as diluents and do not appreciably contribute to the control of the reactivity of the polyhydroxy benzene and formaldehyde.

The following examples, in which all parts are by weight, illustrate the preparation of the 1,3-polyhydroxy benzene-formaldehyde resins of this invention, as low polymers in the A-stage:

Example II

| | Parts |
|---|---|
| Resorcinol | 440 |
| Paraformaldehyde | 120 |
| Methanol anhydrous | 250 |
| Ammonium hydroxide | ¼ |

The methanol was placed in a closed reaction vessel equipped with a mechanical stirrer and reflux condenser. Then the resorcinol and paraformaldehyde were added. The reaction vessel was heated externally while the reaction mixture was being rapidly stirred. The reaction temperature was brought to the reflux point of methanol (about 75° C.) and gradually decreased thereafter to about 68° C. In some cases, the temperature may reach a maximum of about 85° C. During the heating process, the milky color due to the paraformaldehyde being suspended in the methanol disappeared in about twenty minutes. After refluxing for sixty minutes, the reaction had resulted in a suitable resinous product in the A-stage. Thereafter, 122 parts of methanol were added to terminate the reaction. The viscosity of the resinous solution, or varnish, at 25° C., with a No. 1 Demmler cup, was 48 seconds. It is desirable to add a small amount of an acid to neutralize the ammonium hydroxide, thereby to improve the stability of the resin solution in storage.

*Example III*

| | Parts |
|---|---|
| Resorcinol | 440 |
| Paraformaldehyde | 120 |
| Methanol—99–100% | 250 |
| Concentrated ammonium hydroxide | ¼ |

These ingredients were reacted as under Example II, but at the end of sixty minutes' reflux time, 244 parts by weight of n-butanol were added.

*Example IV*

| | Parts |
|---|---|
| Resorcinol | 220 |
| Paraformaldehyde | 70 |
| Methanol—99.7% | 250 |
| Hydrochloric acid | ½ |

These ingredients were reacted in a closed reaction vessel equipped with a reflux column by heating to 75° C. when refluxing began and the temperature fell to 68° C. in 30 minutes. The resin solution was viscous but clear at the end of this time. To the solution was added 120 parts of methanol to cool the solution and to provide a solution of low viscosity for various applications. Sufficient sodium hydroxide was added to neutralize the hydrochloric acid catalyst thereby rendering the resin solution more stable in storage. This solution was held in storage for many months witthout gelling.

Further details and examples of preparation of the polyhydroxy benzene-aldehyde products are disclosed in my copending patent application, Serial No. 639,431, filed January 5, 1946, issued as Patent 2,477,641.

By employing anhydrous reactants and the necessary proportions of methanol, it is easy to produce predetermined resinous products in which the proportions of the polyhydroxy benzene having the unit formula

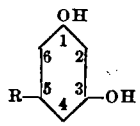

as described previously, with formaldehyde may vary from 0.67 to 1.1 moles of the polyhydroxy benzene for each mole of the formaldehyde. Resinous products suitable for most applications are prepared from substantially equimolar proportions of the polyhydroxy benzene and formaldehyde since best results for many applications are obtained with one mole of polyhydroxy benzene to from 1.0 to 1.05 moles of formaldehyde. However, the mole proportion of formaldehyde may be as low as 0.5 per mole of polyhydroxy benzene if resinous materials of these proportions are desired.

The varnishes derived from the reaction preferably contain polymers of a low molecular weight in order to insure solubility thereof in the solvents employed. It has been found that methanol must be a component of the solvent, if good storage or shelf-life is to be obtained. Approximately 30% by weight of the varnish should be methanol. Larger proportions of methanol have been found to impart better stability. For example, a resin solution produced in accordance with Example II has been stored for two years without any pronounced change or deterioration in its properties. The solvent for the varnish may contain other organic solvent liquids in addition to methanol to secure a suitable viscosity, drying time and other characteristics. Ethanol, isopropanol, butanol, ethyl acetate and other volatile solvents may be added. Plasticizers, inhibitors and other agents also may be present.

In preparing resinous compositions in accordance with the present invention into each 100 parts by weight of the polyhydroxy benzene-aldehyde resin produced as indicated herein there is added from 100 to 1000 parts by weight of a thermoplastic polymer of a compound having the group $H_2C=C<$, the polymer being selected from at least one of the group consisting of polyvinyl esters of carboxylic acids, polyvinyl alcohol, polyvinyl acetals, polymethacrylate esters and polyacrylate esters. Thermoplastic polymers suitable for this purpose are polyvinyl acetate, polyvinyl acetatebutyrate, polyvinyl alcohols, polyvinyl formal, polyvinyl acetal, polyvinyl butyral, polyacrylates, such as methyl acrylate, and polymethacrylates, such for example, as methylmethacrylate and propyl-methacrylate. Mixtures of the thermoplastic polymers may be employed. The thermoplastic resins may be of low, medium or high molecular weight depending on the hardness, toughness, thickness or other properties desired of the resinous composition before or after heat treatment.

Examples of other suitable thermosetting polyhydroxy benzene-formaldehyde resinous materials for combination with the thermoplastic polymers are orcinol-formaldehyde, pyrogallol-formaldehyde, phloroglucinol-formaldehyde and 1,3-dihydroxy-4-chlorobenzene-aldehyde resins in a partially reacted state.

The thermoplastic polymer of a compound having the formula $H_2C=C<$ and the polyhydroxy benzene aldehyde reaction product may be admixed while in solution, the solvents being similar or compatible, to produce a combined solution that may be applied in the form of a varnish coating or impregnant to members. In some cases, the solvent for the composition may be greatly reduced or almost entirely eliminated and the resinous composition in the form of a gummy or heavy sirup consistency may be applied by spreading it upon the surfaces of the members or impregnating it into porous materials by pressure. Fabrics may be coated by means of a doctor blade or the composition may be calendered thereto. Thereafter, the members with the applied resinous compositions may be heat treated at temperatures of above 50° C. until the composition has hardened into a thermoset state. Preferably, the temperatures are in the range of from about 80° to 250° C. or even higher since the reaction into a heat-hardened thermoset state is greatly accelerated with increase of temperatures.

The following are examples of the preparation of resinous compositions in accordance with the invention.

Example V 67 parts by weight of a resorcinol-formaldehyde resin, prepared as in Example II, in solution in methanol to a 60% solids content is mixed with a solution composed of 200 parts by weight of polyvinyl acetate of medium molecular weight dissolved in 400 parts by weight of acetone. The composition is ready for application to laminations of metal immediately on thorough mixing.

Example VI 27 parts by weight of resorcinol-formaldehyde resin prepared in accordance with Example II dissolved in methanol to a 60% solids content is admixed with 200 parts by weight of a solution composed of 40 parts by weight of a high molecular weight polyvinyl acetate in 160 parts by weight of acetone. The composition was ready for use after thorough mixing.

Example VII 400 parts by weight of low molecular weight polyvinyl acetate was dissolved in 400 parts by weight of benzene mixed with 400 parts by weight of ethanol and to the solution was added 600 parts by weight of a 60% solid content resorcinol-formaldehyde resin prepared in accordance with Example II in methanol.

In Examples V to VII above, a basic catalyst may be added to the composition in amounts of up to 10% of the weight of the resorcinol-formaldehyde resin present. Suitable catalysts are ammonium hydroxide, ethylenediamine and hexamethylenetetramine. Such basic catalysts will lower the baking times and temperatures required to set the binding agent when applied to laminations of metal.

Example VIII

Three parts of 15% hydrolyzed polyvinyl acetate, medium molecular weight, dissolved in a mixture of equal parts of acetone and ethyl acetate to produce a 20% solution was combined with one part of resorcinol-formaldehyde resin, produced in accordance with Example II, dissolved in methanol to produce a 50% solution.

Resorcinol-formaldehyde resins prepared in accordance with Example II were admixed in various proportions with solutions of methyl methacrylate, propyl methacrylate, polyvinyl formaldehyde, polyvinyl butyral, polyvinyl acetal and polyvinyl alcohol derived from a polyvinyl acetate hydrolyzed less than 50%. These compositions formed excellent adhesives when applied to the contacting areas of members and heat treated to a thermoset state.

Referring to Fig. 1 of the drawing, there is illustrated a bonded core 10 composed of a plurality of laminations of magnetic sheets 12 bonded by applying thereto the composition such as in Example V. The laminations were individually coated with the composition and allowed to dry either by exposure to the atmosphere or placed in ovens at a temperature of 80° C. for a few minutes. After drying, the laminations were superimposed on one another to form a stack and the stack was placed in a jig where a pressure of some 10 to 100 pounds per square inch could be applied. The stack was then baked in an oven for four hours at a temperature of 150° C. to 250° C. If a basic catalyst is employed in the composition, these baking times may be reduced. The baked cores, after cooling to temperatures at which they could be handled, can be machined to predetermined size and shape. The machining operations may consist of milling, drilling, grinding, and the like. In making magnetic cores, it may be desirable to etch the machined core 10 in order to remove burrs and metal particles that may short circuit the laminations. Eetching in nitric acid for a few minutes has been found satisfactory for this purpose. The bond between laminations withstands the action of the acid and subsequently applied alkalies and water for neutralizing excess acid.

An advantageous application for the bonding compositions of this invention is in the making of the wound magnetic core 20 shown in Fig. 2 of the drawing. The core 20 is prepared by winding a continuous strip of magnetic steel about a rectangular mandrel. The continuously wound core enables an efficient use of silicon iron magnetic material having a preferred direction of magnetic orientation of crystals. After the core has been wound into a rectangular body, it is strain annealed at temperatures of above 600° C. to remove the winding strains and when cool it is submerged in the bonding composition described herein. The resinous composition will readily penetrate the spaces between the windings 26. To insure thorough impregnation, the wound cores may be placed in a vacuum impregnating tank where a low vacuum is applied to remove any gases between the turns of the core and thereafter the solution of polyhydroxy benzenealdehyde resin and thermoplastic resin is admitted to immerse the cores in the tank. Pressure may be applied to as high a value as 100 pounds per square inch to force the resinous composition into the spaces between the laminations 26. The composition may be drained from the cores after 30 minutes and a slight vacuum applied to remove excess adhesive composition. The wound and impregnated cores may be placed in jigs in order to maintain predetermined shape and baked at temperatures of up to 250° C. for several hours to polymerize and harden the composition. After cooling to room temperature the baked cores are removed from the jigs and may be cut by means of a milling cutter, saw, or thin grinding wheel into two U-shaped magnetic cores 22 and 24. The faces 28 may be ground and etched to put them into a flat planar shape and to remove burrs and other short-circuiting particles. Nitric acid etching, for example, is satisfactory for this purpose. After etching, excess acid may be washed off with alkalies and water.

As shown in the greatly enlarged view in Fig. 3 of the drawing, the laminations 26 are impregnated and cemented together by the resin composition 30 between the respective laminations. A high degree of resin filling between laminations is present.

The temperature-strength characteristics of the bonds produced with the composition of this invention are outstanding. Referring to Fig. 4 of the drawing, there is a plot of bond strength in pounds when the composition of Example V was applied to metal sheets having an area of 5.25 square inches and consolidated into a body under heat and pressure, for a range of temperatures of use of from 25° C. to 100° C. At room temperature, approximately 25° C., the bond strength is about 2750 pounds. At 60° C. the bond strength has increased approximately over 50% to about 4200 pounds per square inch. At 80° C. the bond strength is 2500 pounds, while at 100° C. the bond strength is 1450 pounds. An all vinyl resin bond by comparison has a maximum bond strength at 25 C. of 2500 pounds for an area of 5.25 square inches. This value diminishes to 1000 pounds at 60° C. and there is no bond strength at 80° C.

Cores similar to those shown in Fig. 2 of the drawing have been prepared by means of the bonding composition of this invention. When the cores were tested, the change in magnetic losses was approximately 0.8% as an average for a large number of cores. This loss is well within the limit of accuracy of the testing devices employed. It indicates that the composition employed as the binder did not induce appreciable strains in the laminations bonded therewith. This feature of low losses is particularly significant in making cores with magnetic sheets having a preferred direction of magnetization due to crystal orientation since this type of material is extremely sensitive to strains. Ordinary phenol formaldehyde resin binders usually increase the losses when applied to laminations of oriented magnetic sheets 20 to 30% and even higher.

A particular advantage secured by the use of the binding composition of this invention resides in the toughness of the bond. The removal of mandrels from cores after annealing and the cutting and grinding operations subjects the cores to considerable physical stresses and the laminations would break and separate if the bond were brittle or weak. The present composition, however, is so tough that it withstands the machining and other manufacturing operations encountered with substantially no splitting of the cores or other failure.

While the compositions of this invention exhibit highly desirable properties in the manufacture of magnetic cores, the compositions may be employed for bonding other metallic members of any type, wood or laminated plastics. Materials bonded therewith may be cut, drilled and machined to shape in much the same manner as a solid body of the material could normally be machined.

The resinous compositions, after heat treatment to polymerize and cure them, will be found to be relatively impervious to oil, water and fluid dielectrics, such as petroleum oils at temperatures of the order of 100° C. This renders magnetic cores bonded therewith usable in various dielectric fluids.

The resinous compositions of this invention may be employed for impregnating electrical coils and other electrical apparatus, such, for example, as transformers, in which coils and cores are associated in spaced relation. Porous or fibrous material, such, for example, as asbestos cloth, asbestos paper, glass fabrics, cotton duck, wood and the like may be coated or impregnated from solutions of the composition dried at a low temperature and cured by heating under low pressure in order to provide for sheet members and laminates of excellent physical and electrical characteristics. By applying a solution of the polyhydroxy-benzene-formaldehyde and thermoplastic resin to members and drying to evaporate the solvent and superimposing the coated surfaces and curing under pressure, the members may be bonded adhesively. The resinous compositions may be molded with or without various fillers present, such as mica, silica, sawdust, asbestos fibers and the like and cured to a solid thermoset state. Dyes or pigments, plasticizers and other materials introduced into casting or molding compositions so produced may be machined if required to desired shape or size.

Since certain changes in carrying out the above invention may be made without departing from the scope of the disclosure, it is intended that all matter contained in the above description shall be interpreted as illustrative and not in a limiting sense.

I claim as my invention:

1. A resinous composition comprising as its essential ingredients 100 parts by weight of a thermoplastic polymer of a compound having the group $H_2C=C<$, the polymer being selected from at least one of the group consisting of polyvinyl esters of carboxylic acids, polyvinyl alcohol, polyvinyl acetals, polymethacrylate esters and polyacrylate esters and from 10 to 100 parts by weight of the partial resinous reaction product of from about 0.67 to 1.1 moles of a polyhydroxy benzene having the formula

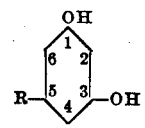

where R is a monovalent radical from the group consisting of hydrogen, halogen, hydroxyl, carboxyl, and saturated aliphatic hydrocarbon radicals and having not more than one substituent from the group, other than hydrogen, for the hydrogen radicals at the 2,4,6 positions, and one mole of a substantially anhydrous aldehyde selected from the group consisting of formaldehyde and its polymers, the polyhydroxy benzene and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of the polyhydroxy benzene, aldehyde and solvent.

2. A resinous composition comprising as its essential ingredients 100 parts by weight of polyvinyl acetate and from 10 to 100 parts by weight of the partial resinous reaction product of from about 0.67 to 1.1 moles of a polyhydroxy benzene having the formula

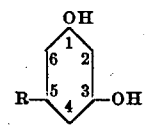

where R is a monovalent radical from the group consisting of hydrogen, halogen, hydroxyl, carboxyl, and saturated aliphatic hydrocarbon radicals and having not more than one substituent from this group, other than hydrogen, for the hydrogen radicals at the 2,4,6 positions, and one mole of a substantially anhydrous aldehyde selected from the group consisting of formaldehyde and its polymers, the polyhydroxy benzene and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of the polyhydroxy benzene, aldehyde and solvent.

3. A resinous composition comprising as its essential ingredients 100 parts by weight of a thermoplastic polymer of a compound having the group H₂C=C<, the polymer being selected from at least one of the group consisting of polyvinyl esters of carboxylic acids, polyvinyl alcohol, polyvinyl acetals, polymethacrylate esters and polyacrylate esters, from 10 to 100 parts by weight of the partial resinous reaction product of from about 0.67 to 1.1 moles of a polyhydroxy benzene having the formula

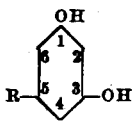

where R is a monovalent radical from the group consisting of hydrogen, halogen, hydroxyl, carboxyl, aliphatic and aryl radicals and having at least two hydrogen radicals at the 2,4,6 positions, and one mole of a substantially anhydrous aldehyde selected from the group consisting of formaldehyde and its polymers, the polyhydroxy benzene and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of the polyhydroxy benzene, aldehyde and solvent, and a solvent for the thermoplastic polymer and the polyhydroxy benzene-aldehyde reaction product.

4. A resinous composition comprising as its essential ingredients 100 parts by weight of a thermoplastic polymer of a compound having the group H₂C=C<, the polymer being selected from at least one of the group consisting of polyvinyl esters of carboxylic acids, polyvinyl alcohol, polyvinyl acetals, polymethacrylate esters and polyacrylate esters and from 10 to 100 parts by weight of the potentially reactive partial reaction product of from about 0.67 to 1.1 moles of resorcinol and one mole of a substantially anhydrous aldehyde selected from the group consisting of formaldehyde and its polymers, the resorcinol and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of resorcinol, aldehyde and solvent.

5. A resinous composition comprising as its essential ingredients 100 parts by weight of polyvinyl acetate and from 10 to 100 parts by weight of the potentially reactive partial reaction product of from about 0.67 to 1.1 moles of resorcinol and one mole of a substantially anhydrous aldehyde selected from the group consisting of formaldehyde and its polymers, the resorcinol and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of resorcinol, aldehyde and solvent.

6. A resinous composition comprising as its essential ingredients 100 parts by weight of a thermoplastic polymer of a compound having the group H₂C=C<, the polymer being selected from at least one of the group consisting of polyvinyl esters of carboxylic acids, polyvinyl alcohol, polyvinyl acetals, polymethacrylate esters and polyacrylate esters, from 10 to 100 parts by weight of the potentially reactive partial reaction product of from about 0.67 to 1.1 moles of resorcinol and one mole of a substantially anhydrous aldehyde selected from the group consisting of formaldehyde and its polymers, the resorcinol and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of resorcinol, aldehyde and solvent, and a solvent for the polyvinyl acetate and the resorcinol-aldehyde reaction product.

7. A member comprising in combination a porous base member and a thermoset resinous material impregnating the porous base member, the thermoset resinous material comprising a cured composition composed of 100 parts by weight of a thermoplastic polymer of a compound having the group H₂C=C<, the polymer being selected from at least one of the group consisting of polyvinyl esters of carboxylic acids, polyvinyl alcohol, polyvinyl acetals, polymethacrylate esters and polyacrylate esters and from 10 to 100 parts by weight of the separately prepared partial resinous reaction product of from about 0.67 to 1.1 moles of a polyhydroxy benzene having the formula

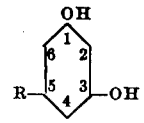

where R is a monovalent radical from the group consisting of hydrogen, halogen, hydroxyl, carboxyl, aliphatic and aryl radicals and having at least two hydrogen radicals at the 2,4,6 positions, and one mole of a substantially anhydrous aldehyde selected from the group consisting of formaldehyde and its polymers, the polyhydroxy benzene and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of the polyhydroxy benzene, aldehyde and solvent.

8. A laminated member comprising in combination a plurality of layers of a fibrous sheet material and a thermoset resinous material applied to the layers of fibrous sheet material bonding the whole, the resinous material comprising a cured composition composed of 100 parts by weight of a thermoplastic polymer of a compound having the group H₂C=C<, the polymer being selected from at least one of the group consisting of polyvinyl esters of carboxylic acids, polyvinyl alcohol, polyvinyl acetals, polymethacrylate esters and polyacrylate esters and from 10 to 100 parts by weight of the separately prepared partial resinous reaction product of from about 0.67 to 1.1 moles of a polyhydroxy benzene having the formula

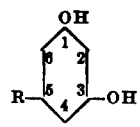

where R is a monovalent radical from the group consisting of hydrogen, halogen, hydroxyl, carboxyl, aliphatic and aryl radicals and having at least two hydrogen radicals at the 2,4,6 positions, and one mole of a substantially anhydrous aldehyde selected from the group consisting of formaldehyde and its polymers, the polyhydroxy benzene and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of the polyhydroxy benzene, aldehyde and solvent.

9. A laminated metal member comprising a plurality of associated metal parts and a resinous binder applied to the metal parts for bonding them into a predetermined shape, the binder comprising the heat-treated composition comprising as its essential ingredients 100 parts by weight of a thermoplastic polymer of a compound having the group $H_2C=C<$, the polymer being selected from at least one of the group consisting of polyvinyl esters of carboxylic acids, polyvinyl alcohol, polyvinyl acetals, polymethacrylate esters and polyacrylate esters and from 10 to 100 parts by weight of the separately prepared partial resinous reaction product of from about 0.67 to 1.1 moles of a polyhydroxy benzene having the formula

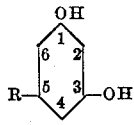

where R is a monovalent radical from the group consisting of hydrogen, halogen, hydroxyl, carboxyl, aliphatic and aryl radicals and having at least two hydrogen radicals at the 2,4,6 positions, and one mole of a substantially anhydrous aldehyde selected from the group consisting of formaldehyde and its polymers, the polyhydroxy benzene and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of the polyhydroxy benzene, aldehyde and solvent.

10. A laminated metal member comprising a plurality of associated metal parts and a resinous binder applied to the metal parts for bonding them into a predetermined shape, the binder comprising the heat-treated composition comprising as its essential ingredients 100 parts by weight of polyvinyl acetate and from 10 to 100 parts by weight of the separately prepared potentially reactive partial reaction product of from about 0.67 to 1.1 moles of resorcinol and one mole of a substantially anhydrous aldehyde selected from the group consisting of formaldehyde and its polymers, the resorcinol and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of resorcinol, aldehyde and solvent.

11. A magnetic core composed of a plurality of laminations of magnetic material bonded face to face by a binder comprising the heat-treated resinous composition comprising as its essential ingredients 100 parts by weight of polyvinyl acetate and from 10 to 100 parts by weight of the separately prepared potentially reactive partial reaction product of from about 0.67 to 1.1 moles of resorcinol and one mole of a substantially anhydrous aldehyde selected from the group consisting of formaldehyde and its polymers, the resorcinol and aldehyde being reacted under substantially anhydrous conditions in the presence of an anhydrous, liquid non-reactive solvent having a boiling point not in excess of 100° C. and not over 2% water, of which solvent methanol equals at least about 25% of the total weight of resorcinol, aldehyde and solvent, the resinous composition being thermoset and maintaining a high bond strength at temperatures of the order of 100° C.

FRITZ J. NAGEL.

REFERENCES CITED

The following references are of record in the file of this patent:

UNITED STATES PATENTS

| Number | Name | Date |
| --- | --- | --- |
| 2,123,155 | Groff | July 5, 1938 |
| 2,261,983 | Ford | Nov. 11, 1941 |
| 2,280,981 | Schum | Apr. 28, 1942 |
| 2,336,792 | Langkammerer | Dec. 14, 1943 |
| 2,372,074 | Ford | Mar. 20, 1945 |
| 2,392,574 | Brown | Jan. 8, 1946 |
| 2,403,077 | Hershberger | July 2, 1946 |
| 2,413,500 | Hummell | Dec. 31, 1946 |
| 2,414,415 | Rhodes | Jan. 14, 1947 |
| 2,430,053 | Hershberger | Nov. 4, 1947 |
| 2,438,097 | Rogers et al. | Mar. 16, 1948 |
| 2,477,641 | Nagel | Aug. 2, 1949 |

FOREIGN PATENTS

| Number | Country | Date |
| --- | --- | --- |
| 228,214 | Switzerland | Nov. 1, 1943 |